United States Patent
Hofmann et al.

[11] Patent Number: 5,996,757
[45] Date of Patent: Dec. 7, 1999

[54] PLATE CLUTCH FOR A MOTOR VEHICLE

[75] Inventors: Klaus Hofmann, Leutershausen; Thomas Rudolf, Dettelbach; Horst Friedrich, Aidhausen; Claus Orth, Mönchstockheim; Werner Selzam, Wipfeld; Jürgen Loibersbeck, Grafenrheinfeld, all of Germany

[73] Assignee: Mannesmann Sachs AG, Schweinfurt, Germany

[21] Appl. No.: 09/146,483

[22] Filed: Sep. 3, 1998

[30] Foreign Application Priority Data

Sep. 4, 1997 [DE] Germany .................. 197 38 596

[51] Int. Cl.[6] .................................. F16D 13/72
[52] U.S. Cl. ............... 192/70.12; 192/70.2; 192/113.2
[58] Field of Search ............... 192/70.12, 70.2, 192/70.19, 113.2, 113.23; 74/467; 403/359

[56] References Cited

U.S. PATENT DOCUMENTS

| | | | |
|---|---|---|---|
| 5,638,932 | 6/1997 | Mizukami | 192/70.12 |
| 5,722,524 | 3/1998 | Mizukami et al. | 192/70.12 |
| 5,779,018 | 7/1998 | Hofmann et al. | 192/70.14 |

FOREIGN PATENT DOCUMENTS

| | | | |
|---|---|---|---|
| 0 797 016 | 9/1997 | European Pat. Off. | F16D 13/56 |
| 195 45 972 A1 | 6/1997 | Germany | F16D 13/60 |

*Primary Examiner*—Charles A Marmor
*Assistant Examiner*—Tisha D. Waddell
*Attorney, Agent, or Firm*—Cohen, Pontani, Lieberman & Pavane

[57] ABSTRACT

The invention is directed to a plate clutch with improved heat removal characteristics. For this purpose, additional axial and radial aerating openings are arranged in the torque-transmitting teeth of the clutch housing.

6 Claims, 4 Drawing Sheets

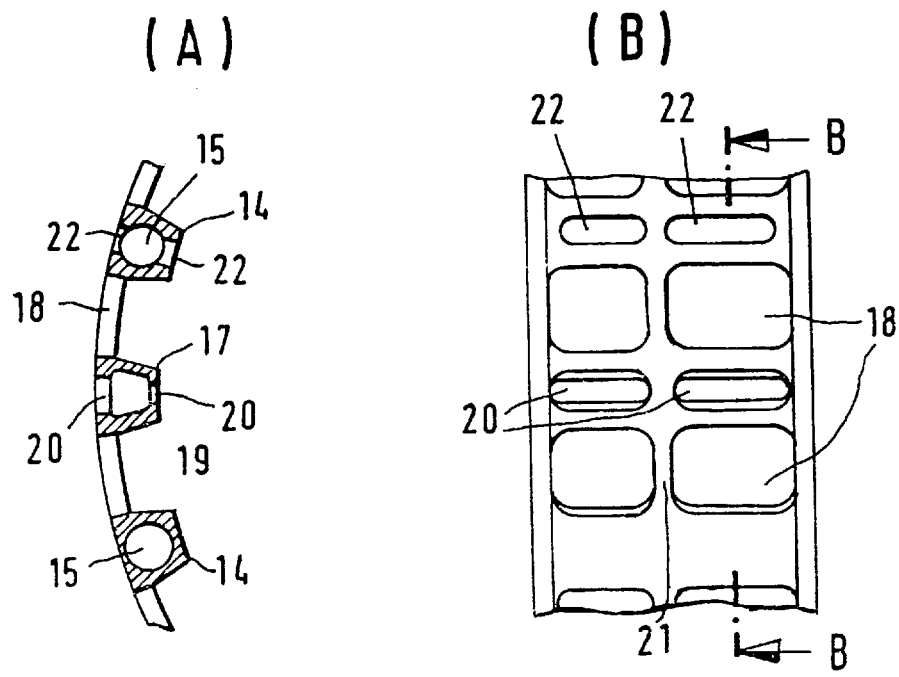
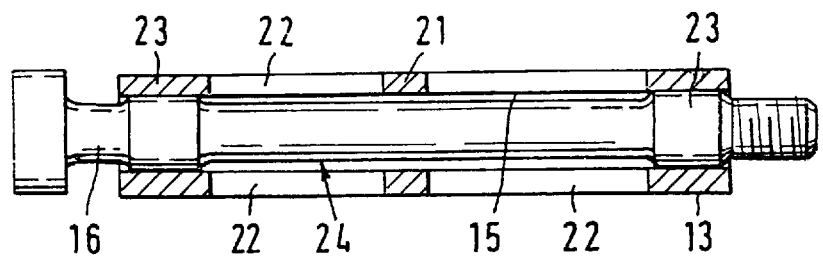
FIG. 5

PLATE CLUTCH FOR A MOTOR VEHICLE

BACKGROUND OF THE INVENTION

1. Field of the Invention

The invention is directed to a plate clutch having inner plates and outer plates and a housing with an internal toothing through which a torque is transmitted to said outer plates.

2. Description of the Related Art

Prior art plate clutches are known, for example, from German Patent Application 195 45 972.5. This known plate clutch is a clutch for a racing car and is outfitted with plates made from carbon material. Clutches of this type of construction are subjected to high thermal and mechanical stresses. In this connection, high loading occurs in the toothing region between the plates and the corresponding teeth. The area pressure at these locations is determined by the quantity of teeth and the dimensioning of the teeth. Although the area pressure in this region is reduced by a large quantity of teeth, the large quantity of teeth reduces the possible ventilation cross sections in the clutch housing. Accordingly, at least temporary temperature build ups must be accounted for in the design of these clutch housings.

SUMMARY OF THE INVENTION

It is the object of the present invention to provide a plate clutch with improved heat removal characteristics.

According to the invention, this object is met by a plate clutch with inner and outer plates and a housing having an internal toothing for transmitting torque to the outer plates, wherein the teeth of the internal toothing include first teeth and second teeth and axially extend along the entire axial length of the housing. The first teeth have longitudinal bore holes for receiving fastening screws. At least one of the second teeth is arranged between each adjacent pair of the first teeth. The housing has radial passages positioned between adjacent teeth of the internal toothing. By introducing longitudinal openings in the second teeth which communicate with radial openings through the radially inner ends of the second teeth to the longitudinal openings, the ventilation cross section as well as the surface of the plate clutch is appreciably increased. This improves the removal of heat substantially. In addition, the mass and mass moment of inertia of the housing are also reduced. At the same time, the temperature distribution is made more homogeneous along the circumference of the clutch housing.

According to a further feature of the invention, the radial openings of the second teeth have essentially the same axial extension as the radial passages located between the teeth. This provides for an optimal aeration.

It is further suggested that the radial openings open out radially inwardly preferably within the head region of the second teeth. A construction of this type is advantageous with respect to the mechanical strength of the housing. However, it is also easily possible to make the radial openings bigger than the head region of the second teeth; in this case, however, it is necessary to coordinate the size of the radial openings with the longitudinal openings with respect to strength.

According to a further feature of the invention, the radial passages and the radial openings are divided into at least two rows in the axial direction and are separated from one another by at least one circumferentially extending, continuous web. Dividing the radial passages and radial openings axially into at least two rows in this way makes it possible to produce a particularly rigid housing.

This web, of which there is at least one, is arranged axially in such a way that it is situated in radial alignment with one of the outer plates. An arrangement of this kind ensures that neither the air conduction nor the removal of abrasion is impeded by the web.

It is further suggested that the fastening screws are constructed in the manner of expansion screws with guide regions in the axial end areas of the longitudinal bores and a reduced diameter therebetween, wherein radial openings are likewise arranged in the first teeth in the region of reduced diameter. As a result of this step, not only is the housing also ventilated in this region, but the fastening screws which are also subjected to heat by the flywheel are also ventilated.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 4A shows a partial side view of the clutch housing;

FIG. 4B shows a sectional view of the clutch housing along line IVB—IVB of FIG. 4A; and FIG. 5 shows a partial sectional view of the clutch housing in the region of a longitudinal bore housing a fastening screw.

DETAILED DESCRIPTION OF THE PRESENTLY PREFERRED EMBODIMENTS

Figure 1:
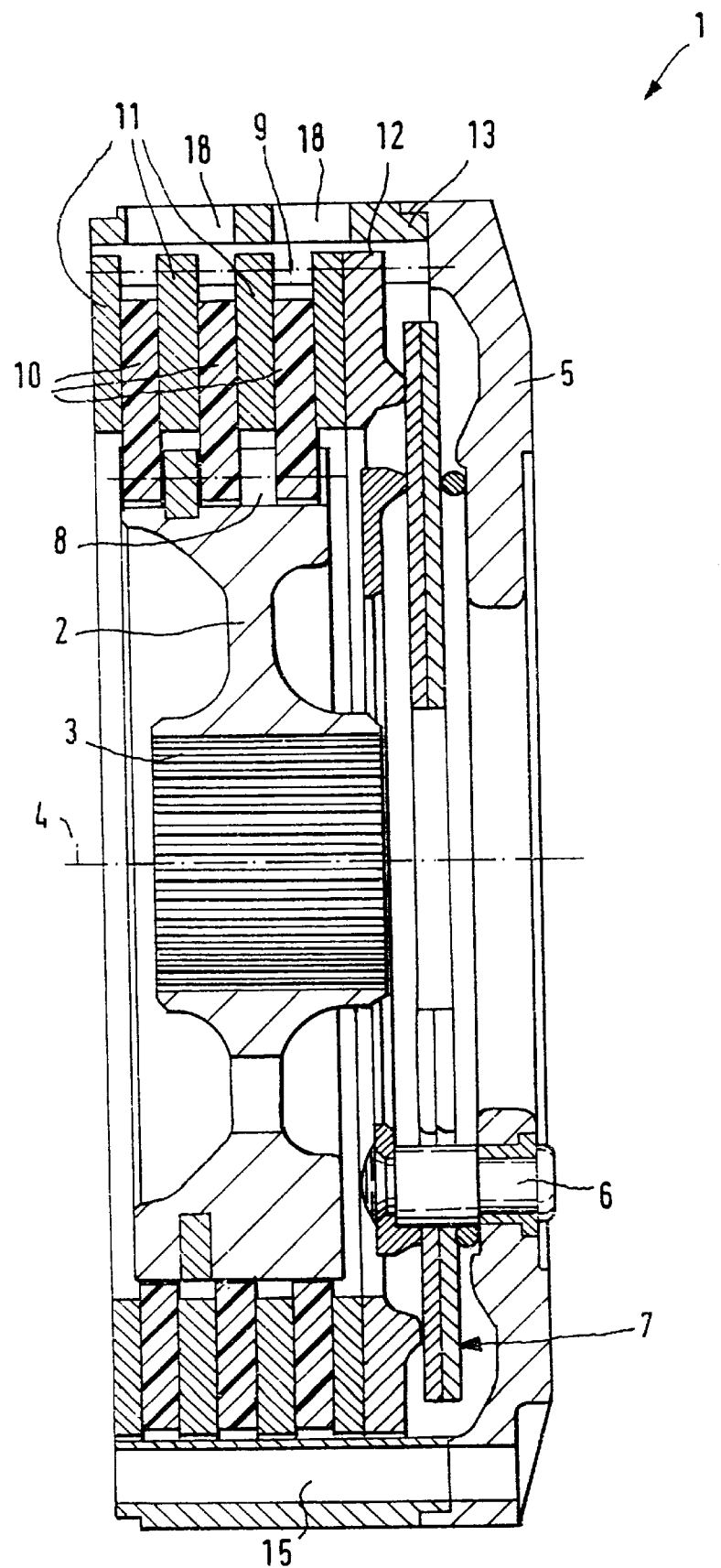
FIG. 1 shows a longitudinal section through a plate clutch according to an embodiment of the present invention.

FIG. 1 shows a longitudinal section through a plate clutch 1. The clutch 1 is concentrically arranged about an axis of rotation 4. The left side of the plate clutch 1 shown in FIG. 1 is fastenable to a flywheel (not shown) by fastening screws (see FIG. 5) which pass through a clutch cover 5 and through longitudinal bores 15 of a clutch housing 13. The clutch 1 has a hub 2 which is arranged so as to be fixed with respect to rotation by a toothing 3 and so as to be axially displaceable on a corresponding counter-toothing of a gear shaft (not shown). A plurality of outer plates 11 and inner plates 10 are alternately stacked along the axial direction within the clutch housing 13. The hub 2 has an outer toothing 8 in its radially outer area. A corresponding toothing on the inner plates 10 engages the outer toothing 8 so that the inner plates 10 are fixed with respect to rotation relative to the hub 2. An inner toothing 9 is arranged in the clutch housing 13. A corresponding toothing on the outer plates 11 engages the inner toothing 9 so that the outer plates 11 are fixed with respect to rotation relative to the clutch housing 13.

A diaphragm spring 7 is swiveably movably supported in the clutch cover 5 for swiveling about spacer pins 6. The diaphragm spring 7 is operatively connected for applying a contact pressure force in its radial outer area via a pressure plate 12 for pressing all of the plates 10, 11 toward the flywheel and into frictional engagement with each other so that torque may be transmitted through the inner plates and outer plates 10, 11 from the clutch housing 13 to the gear shaft connected via toothing 3 to the hub 2. The clutch 1 is released by a clutch release system that acts on the radial inner end region of the diaphragm spring 7 for swiveling the diaphragm spring 7 around the bearing of the spacer pins 6 and thus cancelling its clamping force relative to the pressure plate 12 in its radial outer area. The annular clutch housing 13 is centered at the clutch cover 5 as well as at the flywheel via corresponding centering collars. It has radial passages 18 which enable a ventilation of the interior of the plate clutch 1, so that the temperature level inside the plate clutch can be limited and the abrasion particles created by abrasion occurring at the surfaces of the plates can be removed.

Figure 2:
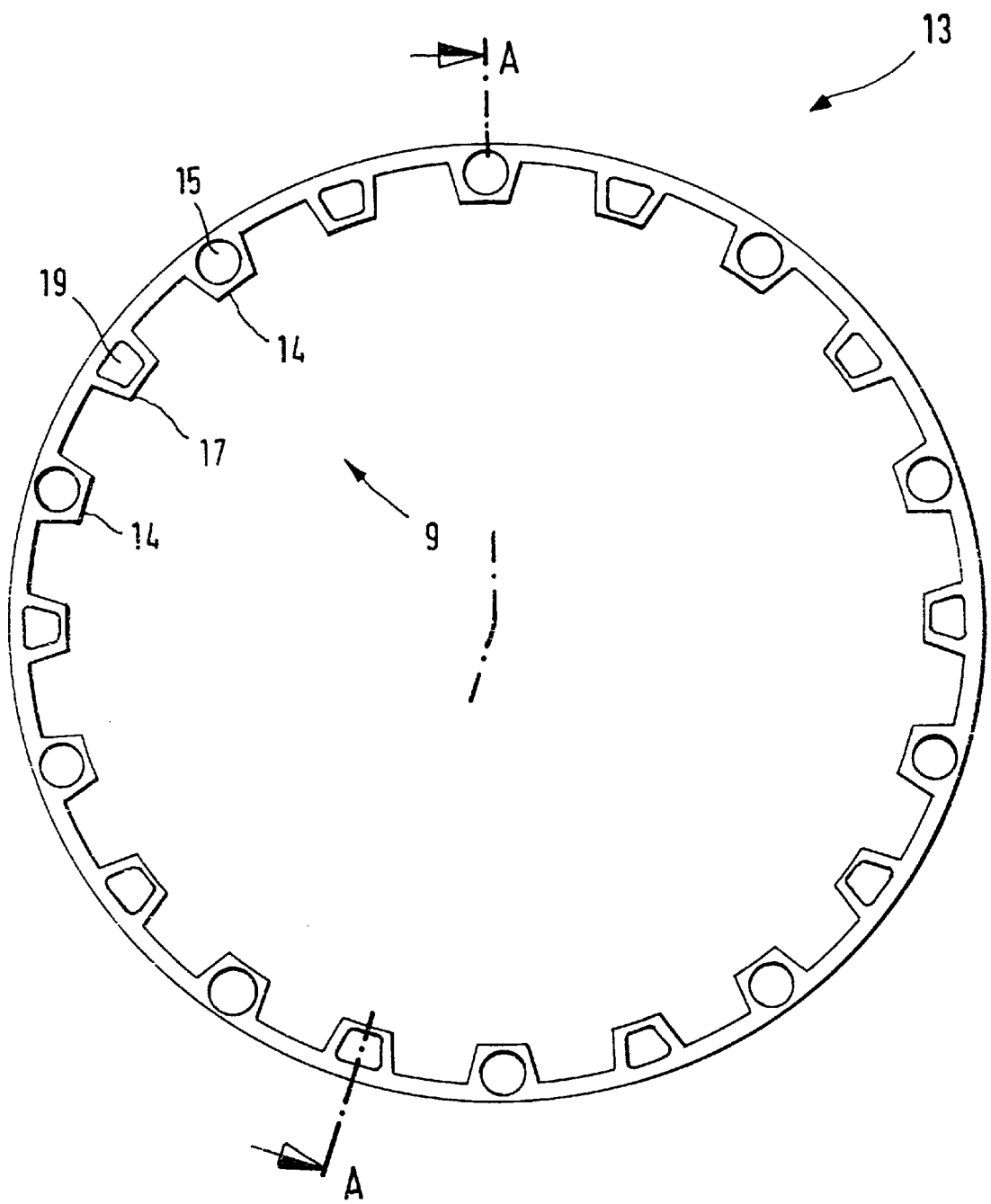
FIG. 2 shows an end view of the clutch housing of the clutch according to FIG. 1.
Figure 3:
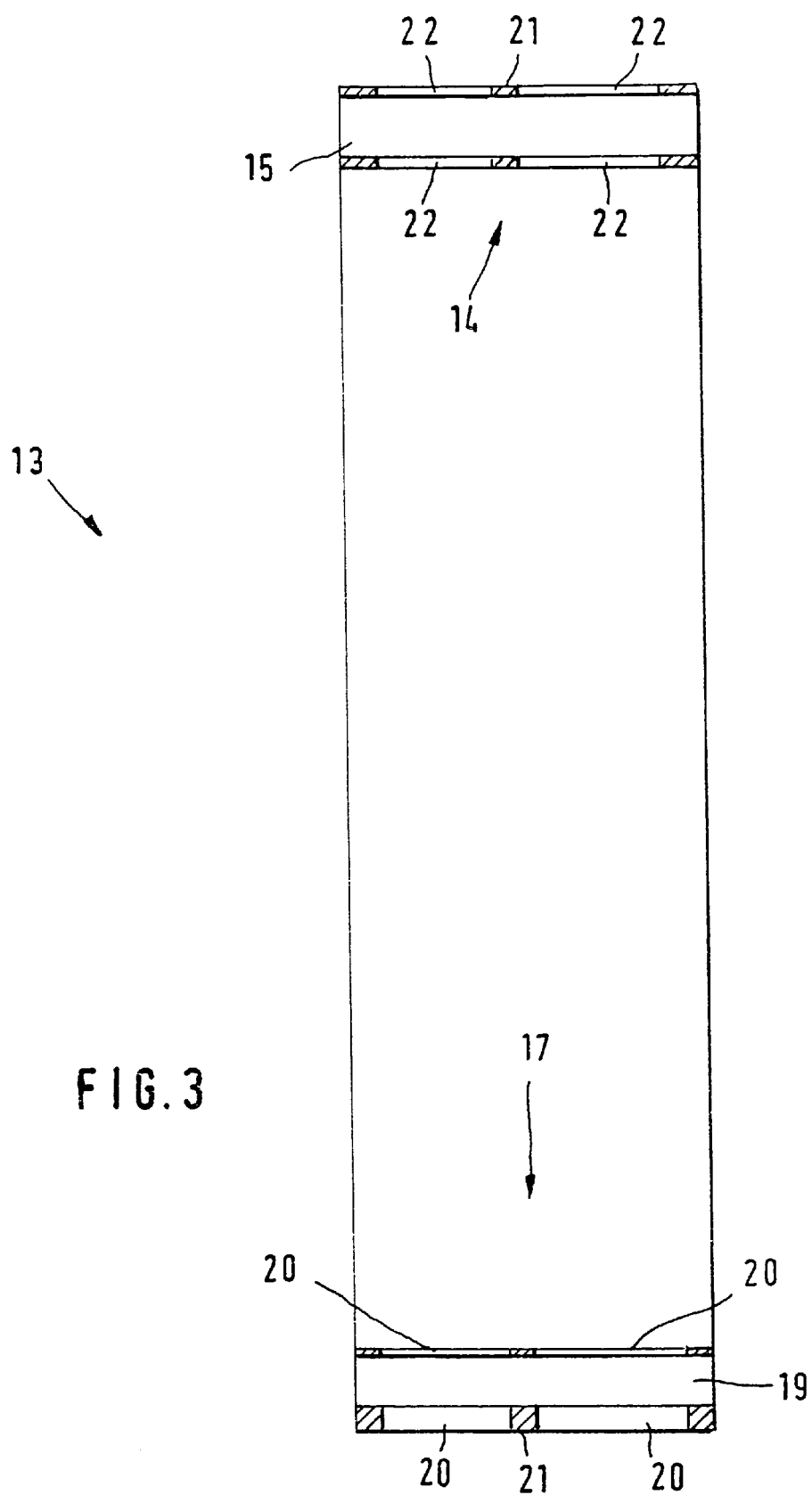
FIG. 3 is a sectional view of the clutch housing through line III—III in FIG. 2.

FIGS. 2 to 5 show details of the plate clutch 1 which present additional ventilation of a plate clutch housing 13. FIG. 2 shows a side view of the clutch housing 13 and FIG. 3 shows a sectional view of the clutch housing 13. The clutch housing 13 is an annular structural component part which includes radially inwardly projecting first and second teeth 14 and 17 which correspond to a corresponding set of teeth on the outer plates 11. In this connection, the first teeth 14 have longitudinal bores 15 for receiving fastening screws 16. At least one second tooth 17 which is not intended for receiving a fastening screw but is likewise provided with a longitudinal opening 19 is arranged between every two first teeth 14 arranged in the circumferential direction. The longitudinal openings 19 of the second teeth 17 are in communication with radial openings 20 which are shown in FIGS. 3 and 4. These radial openings 20 accordingly supplement along the circumference the already existing radial passages 18 which are arranged between the first teeth 14 and the second teeth 17. Further, it can be seen from FIGS. 3 and 4 that each of the radial passages 18 and the radial openings 20 are divided in two sections along the axial direction such that a circumferentially extending continuous web 21 remains between the two sections. This web 21 increases the stability of the clutch housing 13. Viewed along the axial direction, the axial position of the web 21 is arranged in such a way that it is aligned with one of the outer plates 11. Further, FIGS. 3 and 4 in combination with FIG. 5 show that radial openings 22 may also be arranged in the area of the longitudinal bores 15 of the first teeth 14. This is especially useful when the fastening screws 16 are constructed as expansion screws in accordance with FIG. 5. These fastening screws 16 are guided in their axial end areas of the longitudinal bores 15 by guide regions and have a reduced diameter 24 axially between these guide regions 23. Accordingly, it is possible also to enable removal of heat in this region of the clutch housing 13 which in the present case serves also to stabilize the temperature of the fastening screws 16 which are also subjected to heat by the flywheel.

The features described in FIGS. 2 through 5 increase the ventilation cross sections of highly loaded clutches so that radial ventilation is improved on the one hand and the surface area is increased on the other hand. Therefore, an improved removal of heat is achieved through both convection and radiation. This also produces an appreciable reduction in mass and in the moment of inertia which is a very desirable characteristic in race car clutches.

The invention is not limited by the embodiments described above which are presented as examples only but can be modified in various ways within the scope of protection defined by the appended patent claims.

We claim:

1. A plate clutch for a motor vehicle, comprising:

inner plates and outer plates alternately stacked along an axis of rotation of said plate clutch;

an annular clutch housing having an axial length concentrically arranged about the axis of rotation and having an internal toothing with axially extending teeth along said axial length of said housing and a radial passage with an axial length smaller than the axial length of said housing arranged between an adjacent pair of said axially extending teeth;

said internal toothing engaging a corresponding toothing of said outer plates for transmitting a torque from said housing to said outer plates;

said axially extending teeth comprising first teeth and second teeth, each said first teeth having a longitudinal bore for receiving a fastening screw; and one said second teeth being arranged circumferentially between a circumferentially adjacent pair of said first teeth and having a longitudinal opening extending along an axial length of said one of said second teeth and a radial opening, wherein said longitudinal opening is in communication with said radial opening.

2. The plate clutch of claim 1, wherein said radial opening comprises an axial length substantially equal to the axial length of said radial passage.

3. The plate clutch of claim 1, wherein said radial opening opens radially inwardly within a head region of said one of said second teeth.

4. The plate clutch of claim 1, wherein each said radial passage and said radial opening is divided into two rows in the axial direction, said two rows being separated from one another by a circumferentially extending continuous web.

5. The plate clutch of claim 4, wherein an axial position of said web is aligned with an axial position of one of said outer plates.

6. The plate clutch of claim 1, wherein said fastening screws comprise expansion screws having guide regions at axial end areas of said longitudinal bores and having a reduced diameter region therebetween; and said first teeth comprising radial openings arranged substantially in the region of reduced diameter region of said expansion screws when said expansion screws are in their fully received position.

* * * * *